United States Patent [19]
Stroobandt

[11] Patent Number: 5,954,186
[45] Date of Patent: Sep. 21, 1999

[54] SPEED MONITORING IDLER ROLLER FOR CONVEYORS

[75] Inventor: Jack D. Stroobandt, Simpsonville, S.C.

[73] Assignee: Precision, Inc., Pella, Iowa

[21] Appl. No.: 08/763,018

[22] Filed: Dec. 11, 1996

[51] Int. Cl.$^6$ .................................................. B65G 43/00
[52] U.S. Cl. ................................... 198/502.4; 198/810.01
[58] Field of Search .............................. 198/502.1, 502.3, 198/502.4, 577, 810.01, 825, 826

[56] References Cited

U.S. PATENT DOCUMENTS

| | | |
|---|---|---|
| 2,472,526 | 6/1949 | Frazee . |
| 2,688,394 | 9/1954 | Hurd et al. ............................... 198/826 |
| 2,692,951 | 10/1954 | Voelker . |
| 3,780,297 | 12/1973 | Geary . |
| 3,845,375 | 10/1974 | Stiebel . |
| 3,989,989 | 11/1976 | Mayer . |
| 4,135,082 | 1/1979 | Borders, Jr. et al. . |
| 5,332,964 | 7/1994 | Ouchi . |
| 5,451,869 | 9/1995 | Alff . |
| 5,468,072 | 11/1995 | Ekdahl et al. . |

FOREIGN PATENT DOCUMENTS

| | | | |
|---|---|---|---|
| 2807173 | 8/1979 | Germany ............................. | 198/502.4 |
| 487817 | 10/1975 | U.S.S.R. ............................. | 198/502.4 |
| 93/24804 | 12/1993 | WIPO . | |

OTHER PUBLICATIONS

Omron; Cylindrical Inductive Proximity Sensor—Ordering Information; one sheet—p. 409.
Model MS Motion Switch and Model MSD Motion Switch; pp. 5 & 8 from catalog (two sheets).
Digital Tachometer, one sheet pamphlet.
4B Components Limited; Rotech Encoder Rotating Shaft Monitor; Jan. 1996; pamphlet consisting of one sheet.
McMaster–Carr; Proximity Sensing Switches—Photoelectric Sensors & Timers; one sheet from catalog.
Reliance Electric; USAF/USN Bearing Monitors; consisting of three sheets (pamphlet).
Rotech; Roller–Encoders Speed Measuring Rollers; pamphlet consisting of five pages.

*Primary Examiner*—Janice L. Krizek
*Assistant Examiner*—Thuy V. Tran
*Attorney, Agent, or Firm*—Henderson & Sturm

[57] ABSTRACT

A conveyor system of a type having a first pulley disposed for rotation about a first axis and a second pulley disposed for rotation about a second axis substantially parallel to the first axis. The continuous conveyor belt is disposed around the first and second pulleys. The first idler roller rotatably disposed along a third axis is substantially parallel to the first axis and parallel to the first axis is provided for supporting the weight of a conveyor belt and the materials moving thereon, said third axis being fixed with respect to the first axis. A second idler roller is disposed along a fourth axis, the fourth axis being substantially parallel to the first axis. The second roller is disposed below a bottom portion of the fixed axis conveyor belt for supporting the weight of the conveyor belt. An encoder is disposed on the stationary shaft inside one of the idler rollers for monitoring rotation of the idler rollers with respect to the shaft.

3 Claims, 2 Drawing Sheets

SPEED MONITORING IDLER ROLLER FOR CONVEYORS

CROSS-REFERENCE TO RELATED APPLICATIONS

Not Applicable.

STATEMENT REGARDING FEDERALLY SPONSORED RESEARCH OR DEVELOPMENT

Not Applicable.

MICROFICHE APPENDIX

Not Applicable.

BACKGROUND OF INVENTION

1. Field of Application

This invention relates to a device for monitoring belt speed and movement for bulk material conveyor systems, and more particularly to underspeed, overspeed and slip detectors for conveyor belts and other material moving components of such systems and to a zero speed switch.

2. Description of Prior Art

Bulk material handling conveyor systems usually include at least one belt conveyor which receives bulk material, such as coal, iron ore, cement, etc. to transport same between locations removed, one from the other, for the purpose of stocking, processing, shipping, or other required handling incident to the use of the bulk material. Such systems may also include: multiple conveyors located in a collinear fashion (which may be referred to as upstream and downstream conveyors); conveyors which co-operate to move material in two different directions (which may be referred to as a main conveyor and a shuttle conveyor); and a conveyor co-operating with a bulk material elevator for changing the level of material flow.

The increasing demand for large, highly complex and high speed bulk material conveyor systems has created a need for more effective control devices to detect malfunctions in such systems, and protect the expensive mechanical components required in such systems. Unfortunately presently available control systems are few in number, are high in cost, are usually designed for a particular system and thus lack the versatility to permit use thereof with another system without significant re-design and modifications, and quite often provide inoperable solutions.

Rotech manufactures speed measuring rollers which have a roller mounted on an arm which is biased against the underside of a conveyor belt. It has an encoder associated with such roller for belt speed measurement, slip detection, stop detection, belt weighers, belt interlocking and belt indexing. A problem with this type of sensing is that it adds additional parts instead of being a substitute for an existing roller as is the intention of the present invention.

BRIEF SUMMARY OF THE INVENTION

The present invention relates to a conveyor system of a type having a first pulley disposed for rotation about a first axis and a second pulley disposed for rotation about a second axis substantially parallel to the first axis. The continuous conveyor belt is disposed around the first and second pulleys. The first idler roller rotatably disposed along a third axis is substantially parallel to the first axis and is provided for supporting the weight of a conveyor belt and the materials moving thereon, said third axis being fixed with respect to the first axis. A second idler roller is disposed along a fourth axis, the fourth axis being substantially parallel to the first axis. The second roller is disposed below a bottom portion of the fixed axis conveyor belt for supporting the weight of the conveyor belt. An encoder is disposed on the stationary shaft inside one of the idler rollers for monitoring rotation of the idler rollers with respect to the shaft.

In a preferred embodiment, the encoder comprises a target on the idler roller and a proximity sensor mounted on the shaft for sensing the target when it rotates past the proximity sensor and a line is provided for sending the signal information from the proximity sensor to a zero speed monitor, a speed control monitor, or to a programmable logic controller (PLC). A zero speed monitor is a device to indicate or control the drive when zero speeds are detected.

It is therefore an object of this invention to provide a novel and improved speed sensing system for a bulk material conveyor system.

It is another object of this invention to provide novel and improved underspeed, overspeed and slip detector sensors for material handling belts and other material moving components of a bulk material conveyor system.

It is a further object of this invention to provide novel and improved speed controls for a bulk material conveyor system for example, to perform the functions disclosed in U.S. Pat. No. 3,989,989 to Mayer.

Another object is to provide a sensor unit inside of an idler unit which can be placed anywhere that an ordinary idler roller is used to support a conveyor belt.

Other objects, advantages, and novel features of the present invention will become apparent from the following detailed description of the invention when considered in conjunction with the accompanying drawings.

DETAILED DESCRIPTION OF THE INVENTION

Figure 1:
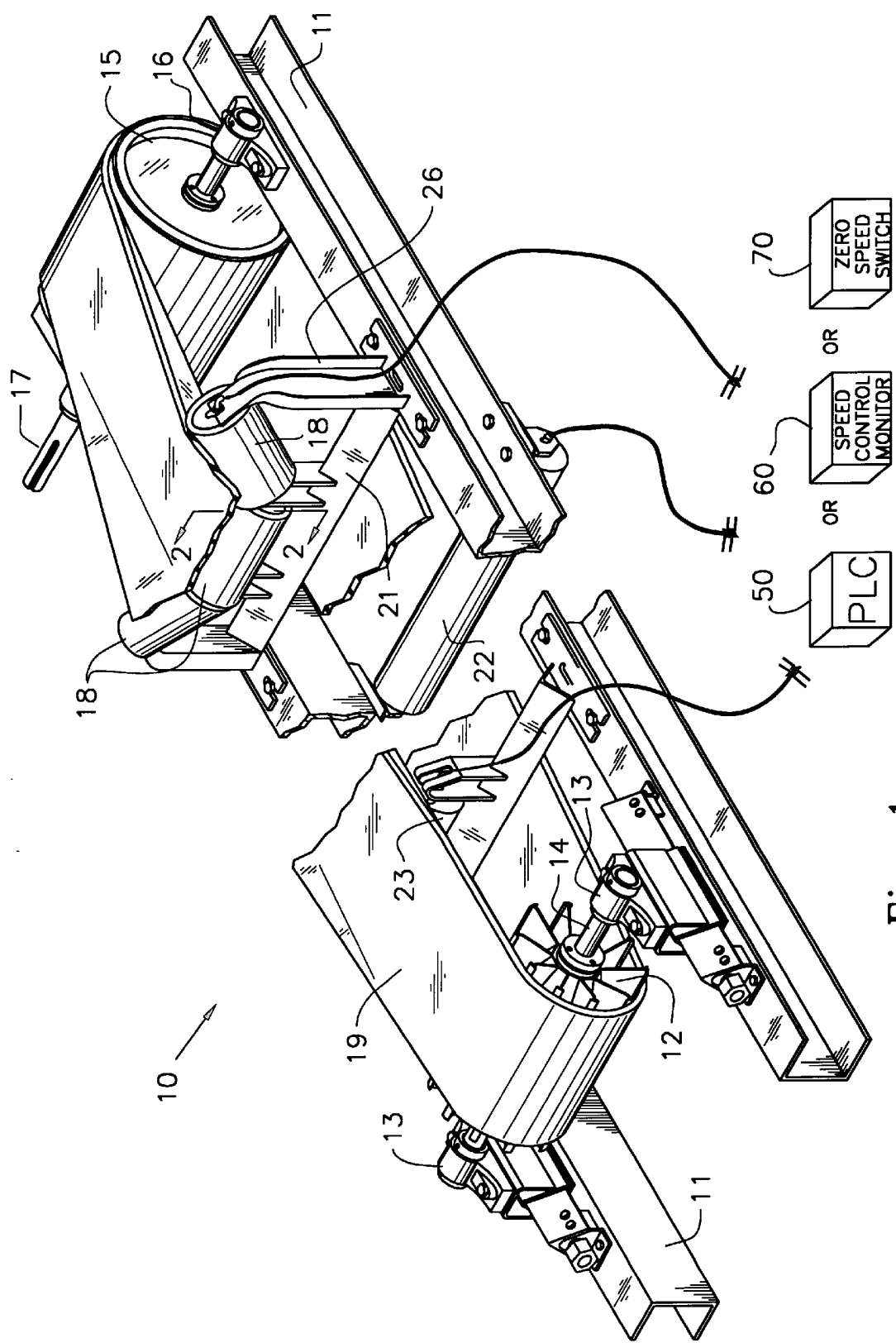
FIG. 1 is a perspective view of a conveyor system utilizing the present invention.

Referring now to the drawings wherein like reference numerals designate identical or corresponding parts throughout the several views, FIG. 1 shows a conveyor belt system (10) constructed in accordance with the present invention. A frame (11) is provided for attaching a first pulley (12) through bearings (13) to the frame whereby the pulley (12) rotates with the shaft (14). A drive pulley (15) is rotatably attached to the frame on bearings (16) whereby a drive shaft (17) is rotated by a source of rotary power to cause the entire system to operate when desired. Idler rollers (18) form a trough for conveyor belt (19) to support the weight of the conveyor belt (19) and to support the weight of the material being conveyed thereon. The frame (21) is provided for holding the idler rollers (18) in the position shown in FIG. 1.

Figure 2:
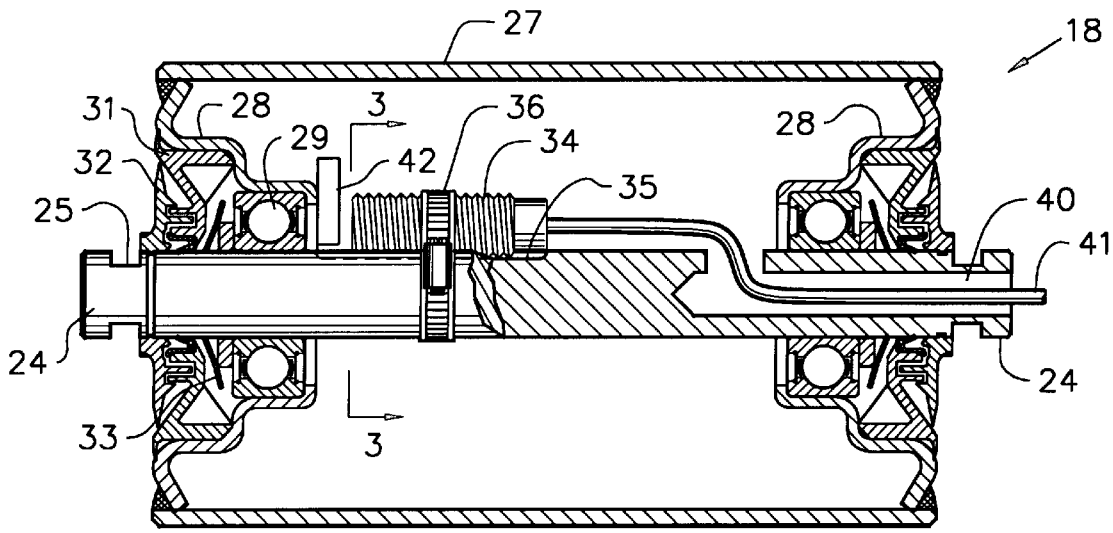
FIG. 2 is a cross sectional view taken along line 2—2 of FIG. 1 and showing a proximity sensor mounted to a stationary shaft for sensing a target attached to the idler roller as the idler roller rotates.
Figure 3:
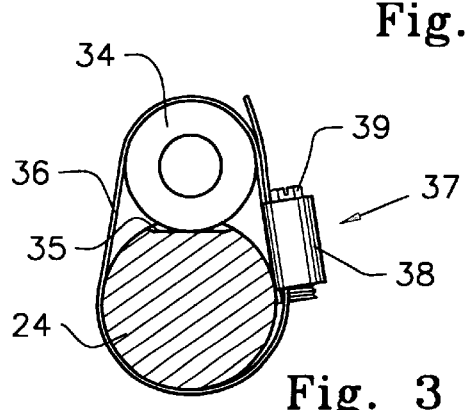
FIG. 3 is a cross sectional view taken along line 3—3 of FIG. 2.
Figure 4:
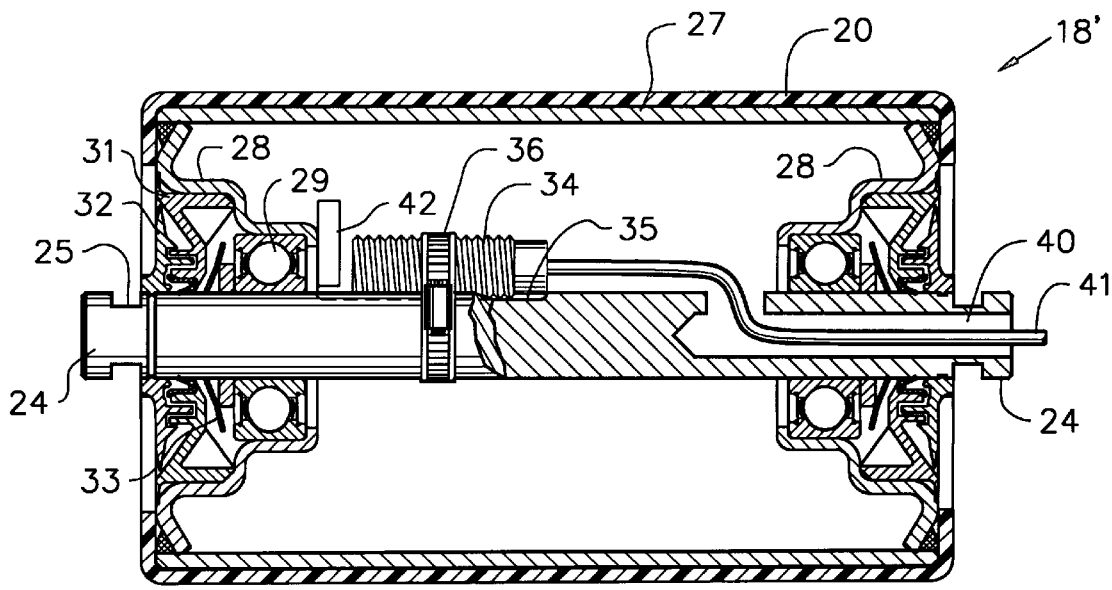
FIG. 4 is a view of an alternate embodiment which is substantially like that shown in FIG. 2 except for a elastomer coating on the roller to increase the life thereof.

A long idler roller (22) is mounted below the conveyor belt for supporting the weight of the conveyor belt (19) on the bottom to keep it from sagging. Another roller (23) can optionally be provided anywhere under the belt for monitoring the speed of rotation thereof and all of the idler rollers (18), (22) and (23) can be constructed like that shown in FIGS. 2, 3 and 4, even though FIGS. 2, 3 and 4 depict the rollers (18) and (18'). The roller (18') differs from the roller (18) of FIGS. 1 and 2 only because it is covered with a elastomer coating such as polyurethane or rubber (20) for longer life.

Referring to FIG. 2, a stationary shaft (24) has a pair of slots (25) disposed therein for connection to a slotted member like member (26) in FIG. 1 on each end thereof for holding the shaft (24) stationary with respect to the frame (11). The idler roller has a cylindrical portion (27) welded to end caps (28). Roller bearings (29) are disposed in the end caps as is male labyrinth (31) and female labyrinth seal (32). A spring steel push nut (33) holds the bearings (29) in place.

A proximity sensor (34) is disposed in a slot (35) in shaft (24) and is held in place by a strap (36) of a hose clamp (37) having a portion (38) in which a threaded bolt (39) is held and can be rotated to loosen or tighten the strap (36) around the shaft (24) and proximity sensor (34). An opening (40) in the shaft (24) is provided so that an electrical wire (41), attached at one end thereof to the proximity sensor (34) can lead to a speed control monitor (60), a programmable logic controller (50) or to a zero speed switch (70). The preferred proximity sensor (34) is a prewired inductive proximity sensor sizes TL-X5-Y1, M18 manufactured by OMRON.

A target (42) is attached to the end cap (28) and is fixed in position so that as the idler roller (18) rotates, the target (42) also rotates about the stationary shaft (24). Each time the target (42) passes the proximity sensor (34), a signal will be sent through line (41) to the programmable logic controller (50) or the speed control monitor (60) or the zero speed switch (70).

The roller (18) and (18') can be factory assembled and mounted anywhere in the belt conveyor system. There is no adjustment required and the proximity sensor (34) is protected from the harsh environments often present in these types of conveyor systems. A elastomer coating (20) on the roller (18') adds life to this special idler roller. No special mounting brackets are required for the roller, since they can be mounted just like any other idler roller in the system.

In operation, as the conveyor (10) operates, any one of the standard rollers (18), (22) or (23) can be of a type shown in FIGS. 2 or 4 having a proximity sensor (34) therein. Also, any of the other idler rollers (not shown) in the broken-away portion of the conveyor could also utilize this invention. Typically however, only one of the rollers is chosen to be replaced with the type shown in FIGS. 2 or 4 having a proximity sensor disposed therein, although it is within the scope of this invention to use more than one roller of this type. No specially constructed devices for monitoring the speed or motion of the conveyor is necessary, but merely using a replacement of existing rollers is the primary aspect of this invention. Of course the proximity sensor could be replaced with other types of sensors for example those of an optical type or the like. Previous sensors often require that the sensor be on a bearing of a pulley, such as on the bearings (13) or (16) shown in FIG. 1 or as a separate device coupled to a pulley shaft (14), whereas the present invention is integral to a device that is already on the conveyor, i.e., the idler pulley.

In operation, the conveyor belt is moved by rotating the shaft (17) of FIG. 1 so that the drive pulley (15) rotates the entire conveyor belt (19) pulley (12) and rollers (18), (22) and (23). There would, of course, normally be a load of material on top of the conveyor belt (19). With each revolution of the roller (18), for example, the target (42) passes by the proximity sensor (34) which reads the presence of metal and closes the switch in the proximity sensor (34). Each time the switch in the proximity sensor (34) is closed, an electrical pulse is generated. This pulse signal is transmitted by an electrical line (41) to a PLC (50), or a speed control monitor (60), or a zero speed switch (70).

The PLC (50) is a programmable logic controller or computer designed for industrial use. It can be programmed to use the signal generated by the proximity sensor (34) for any purpose that is desired such as; to detect belt slippage, belt overspeed, belt underspeed, belt stoppage or breakage or any other conditions which may be to some extent dependent upon speed or rotation of the idler roller.

The speed control monitor (60) or a PLC (50) can be used to keep the conveyor belt (19) at a desired speed so that if it is going too slow or too fast, based on the signals received from the proximity sensor (34), the drive motor can be adjusted to compensate for the deviations from the ideal or desired speed.

The zero speed switch (70) is used to send a signal to a primary controller or to directly shut the drive motor off when the roller stops rotating or when zero speed is sensed by the proximity sensor.

It is also to be understood that this system could be used for multiple conveyors. In situations where the materials go from one conveyor to other conveyors it may be desirable for the entire conveyor system to stop if a downstream conveyor were to stop. In such a situation, the proximity sensor (34) in the stopped idler roller would send a signal to the PLC (50). The PLC (50) would be programmed to stop the upstream conveyors so that the other conveyors do not continue to dump materials onto the stopped downstream conveyor. These are but several of many examples of the use of the present invention.

It will be appreciated that the present invention accomplishes the objects stated above. Obviously many modifications and variations of the present invention are possible in light of the above teachings. It is therefore to be understood that, within the scope of the appended claims, the invention may be practiced otherwise than as specifically described.

What is claimed is:

1. In a conveyor system of a type including:
   a first pulley disposed for rotation about a first axis;
   a second pulley disposed for rotation about a second axis substantially parallel to said first axis;
   a continuous conveyor belt disposed around said first and second pulleys;
   a first idler roller rotatably disposed on a stationary shaft, along a third axis substantially parallel to said first axis, said third axis being substantially parallel to said first axis, said third axis being substantially fixed with respect to said first axis and under a top portion of the conveyor belt for supporting the weight of materials moving along the conveyor belt; and
   a second idler roller disposed along a fourth axis, said fourth axis being substantially parallel to said first axis, said second roller being disposed below a bottom portion of said conveyor belt for supporting the weight of the conveyor belt, said second idler roller being rotatably disposed on a stationary shaft, the improvement comprising:

an encoder disposed on said shaft inside one of the idler rollers for monitoring rotation of said idler roller with respect to said shaft, said encoder comprising a tar the idler roller and a proximity sensor mounted on the shaft for sensing the target when it rotates past the proximity sensor, said target being attached directly to a tearing cap on one end of the idler roller to which said proximity sensor is attached.

2. The conveyor system of claim 1 including a line connected to said proximity sensor for providing a signal for receiving information from the proximity sensor.

3. The conveyor system of claim 2 including a passageway in the shaft, said line being disposed at least partially in the passageway without interfering with the rotation of the idler roller on the shaft.

* * * * *